United States Patent
Hanazaki (10) Patent No.: US 10,177,411 B2
(45) Date of Patent: Jan. 8, 2019

(54) NONAQUEOUS ELECTROLYTE SECONDARY BATTERY AND METHOD OF MANUFACTURING THE SAME

(71) Applicant: TOYOTA JIDOSHA KABUSHIKI KAISHA, Toyota-shi, Aichi-ken (JP)

(72) Inventor: Ryo Hanazaki, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/511,406

(22) PCT Filed: Aug. 18, 2015

(86) PCT No.: PCT/IB2015/001392
§ 371 (c)(1),
(2) Date: Mar. 15, 2017

(87) PCT Pub. No.: WO2016/042373
PCT Pub. Date: Mar. 24, 2016

(65) Prior Publication Data
US 2017/0263979 A1 Sep. 14, 2017

(30) Foreign Application Priority Data
Sep. 17, 2014 (JP) .................... 2014-189463

(51) Int. Cl.
*H01M 4/00* (2006.01)
*H01M 10/0567* (2010.01)
(Continued)

(52) U.S. Cl.
CPC ......... *H01M 10/0567* (2013.01); *H01M 4/70* (2013.01); *H01M 4/78* (2013.01);
(Continued)

(58) Field of Classification Search
CPC ............... H01M 10/0567; H01M 4/78; H01M 2300/0025; H01M 10/0587; H01M 10/0431; H01M 10/0525
See application file for complete search history.

(56) References Cited

U.S. PATENT DOCUMENTS

2005/0233222 A1    10/2005  Yanagida et al.
2012/0003541 A1*    1/2012  Song .................... H01M 4/364
                                                             429/223
(Continued)

FOREIGN PATENT DOCUMENTS

CN    102315441 A    1/2012
CN    103620839 A    3/2014
(Continued)

*Primary Examiner* — Cynthia H Kelly
*Assistant Examiner* — Monique M Willis
(74) *Attorney, Agent, or Firm* — Sughrue Mion, PLLC (57) ABSTRACT

A nonaqueous electrolyte secondary battery includes: a wound electrode body that is formed by laminating an elongated sheet-shaped positive electrode current collector foil, an elongated sheet-shaped negative electrode current collector foil, and an elongated sheet-shaped separator to obtain a laminate and winding the obtained laminate; a nonaqueous electrolytic solution; and a case that accommodates the wound electrode body and the nonaqueous electrolytic solution. A solid electrolyte interface film derived from an oxalato borate complex is formed on at least a surface of the negative electrode active material layer. The positive electrode current collector foil satisfies the following conditions of (a) $700\% \leq \alpha \leq 760\%$ and (b) $530\% \leq \beta \leq 590\%$, where $\alpha$ represents a 60-degree specular gloss in a direction parallel to a longitudinal direction of the positive electrode current collector foil, and $\beta$ represents a 60-degree specular gloss in a width direction perpendicular to the longitudinal direction of the positive electrode current collector foil.

5 Claims, 5 Drawing Sheets

(51) Int. Cl.
*H01M 4/70* (2006.01)
*H01M 10/0525* (2010.01)
*H01M 10/0587* (2010.01)
*H01M 4/78* (2006.01)
*H01M 10/04* (2006.01)

(52) U.S. Cl.
CPC ... *H01M 10/0431* (2013.01); *H01M 10/0525* (2013.01); *H01M 10/0587* (2013.01); *H01M 2300/0025* (2013.01); *Y02T 10/7011* (2013.01)

(56) References Cited

U.S. PATENT DOCUMENTS

2014/0096375 A1* 4/2014 Hampel ............... H01M 4/661
 29/623.1
2015/0207173 A1 7/2015 Onizuka

FOREIGN PATENT DOCUMENTS

| | | |
|---|---|---|
| JP | 2005-259592 A | 9/2005 |
| JP | 2014-026932 A | 2/2014 |
| WO | 2014/038245 A1 | 3/2014 |

* cited by examiner

NONAQUEOUS ELECTROLYTE SECONDARY BATTERY AND METHOD OF MANUFACTURING THE SAME

CROSS REFERENCE TO RELATED APPLICATIONS

This application is a National Stage of International Application No. PCT/IB2015/001392 filed Aug. 18, 2015, claiming priority based on Japanese Patent Application No. 2014-189463 filed Sep. 17, 2014, the contents of all of which are incorporated herein by reference in their entirety.

BACKGROUND OF THE INVENTION

1. Field of the Invention

The present invention relates to a nonaqueous electrolyte secondary battery and a method of manufacturing the same.

2. Description of Related Art

A nonaqueous electrolyte secondary battery such as a lithium ion secondary battery (lithium secondary battery) has a lighter weight and higher energy density than those of existing batteries and thus, recently, has been used as a power supply for driving a vehicle. In particular, a lightweight lithium ion secondary battery capable of obtaining high energy density is preferably used as a high-output power supply for driving a vehicle such as an electric vehicle (EV), a hybrid vehicle (HV), or a plug-in hybrid vehicle (PHV). Typical examples of such a nonaqueous electrolyte secondary battery include a nonaqueous electrolyte secondary battery including a wound electrode body. The wound electrode body is formed by laminating an elongated sheet-shaped positive electrode current collector foil, an elongated sheet-shaped negative electrode current collector foil, and an elongated sheet-shaped separator and winding the obtained laminate in a sheet longitudinal direction. The elongated sheet-shaped positive electrode current collector foil has a surface, on which a positive electrode active material layer containing a positive electrode active material is formed, and is typically aluminum foil. The elongated sheet-shaped negative electrode current collector foil has a surface, on which a negative electrode active material layer containing a negative electrode active material is formed, and is typically copper foil. The nonaqueous electrolyte secondary battery including the wound electrode body is constructed by accommodating the wound electrode body and a nonaqueous electrolytic solution in a predetermined battery case. Here, this nonaqueous electrolytic solution is mainly impregnated into the inside of the wound electrode body (that is, a gap between the positive and negative electrodes and the separator) from opposite end portions of the wound electrode body in a winding axial direction (that is, a width direction perpendicular to the sheet longitudinal direction of the elongated sheet-shaped positive and negative electrode current collector foils constituting the wound electrode body). In order to adjust the constructed nonaqueous electrolyte secondary battery to be in an actually usable state, the nonaqueous electrolyte secondary battery is initially charged under appropriate conditions.

During the initial charging, a portion of the nonaqueous electrolytic solution is reduced and decomposed on the negative electrode to form a film, which is also called a solid electrolyte interface (SEI), on a surface of the negative electrode active material. By the film coating the negative electrode active material layer, the negative electrode is stabilized, and the subsequent decomposition of the nonaqueous electrolytic solution is suppressed. However, the decomposition of the nonaqueous electrolytic solution contributes to the irreversible capacity, which causes a decrease in battery capacity. Therefore, a technique of adding an additive (hereinafter, referred to as "film forming agent), which is decomposed at a decomposition potential or lower of the nonaqueous electrolytic solution so as to form a film on the surface of the negative electrode active material layer, to the nonaqueous electrolytic solution in advance has been widely used. For example, Japanese Patent Application Publication No. 2005-259592 (JP 2005-259592 A) discloses a nonaqueous electrolyte secondary battery in which a nonaqueous electrolytic solution contains lithium bis(oxalato)borate ($Li[B(C_2O_4)_2]$; hereinafter, referred to as "LiBOB") as a film forming agent.

SUMMARY OF THE INVENTION

Such an oxalato borate complex such as LiBOB can form a chemically stable solid electrolyte interface film on the surface of the negative electrode active material layer through initial charging and discharging. The solid electrolyte interface film protects the surface of the negative electrode while allowing movement of charge carriers between the electrolytic solution and the active material and can stably suppress the additional decomposition of the nonaqueous electrolytic solution. Therefore, the battery including the solid electrolyte interface film derived from an oxalato borate complex such as LiBOB that is formed over the entire negative electrode active material layer is preferable because stability and durability can be improved.

However, when the wound electrode body is impregnated with the nonaqueous electrolytic solution containing an oxalato borate complex such as LiBOB, there may be non-uniformity in the formation amount of the film (for example, the thickness of the film, the concentration of the film, or the coating amount) derived from an oxalato borate complex such as LiBOB which is formed on the negative electrode constituting the wound electrode body. In particular, on the surface of the negative electrode active material layer after the impregnation of the nonaqueous electrolytic solution, it is difficult to form a solid electrolyte interface film derived from an oxalato borate complex on a region near the center in the winding axial direction. When the solid electrolyte interface film is not uniformly formed on the surface of the negative electrode active material layer, the stability of the negative electrode may decrease, or a variation in resistance may cause Li deposition. Moreover, the non-uniform formation of the solid electrolyte interface film may cause a decrease in the durability (for example, capacity retention or output after a durability test) of the battery or a decrease (short-circuiting) in the reliability, which is not preferable.

The present invention provides: a nonaqueous electrolyte secondary battery in which a film having a preferable configuration is formed; and a method of manufacturing the same.

The present inventors performed research on the non-uniformity in the formation amount of the film derived from an oxalato borate complex which occurs in the nonaqueous electrolyte secondary battery including the wound electrode body. As a result, it was found that one of the reasons for the non-uniformity is the presence of a sodium component (hereinafter, referred to as "Na component") which is unavoidably contained in the battery case (typically, in the electrode body). That is, a material which is used to prepare the positive electrode, the negative electrode, and the separator constituting the wound electrode body contains the Na component (for example, a Na salt) in many cases. Accordingly, when the wound electrode body is impregnated with the nonaqueous electrolytic solution, first, the Na component is eluted from the electrode body to the nonaqueous electrolytic solution. The Na component (typically, a Na ion) eluted to the nonaqueous electrolytic solution moves along with the movement of the nonaqueous electrolytic solution in the wound electrode body. Typically, since the nonaqueous electrolytic solution is impregnated from opposite ends to the center of the wound electrode body in the winding axial direction, the Na component (Na ion) also moves to the region near the center of the wound electrode body in the winding axial direction correspondingly. At this time, the movement (penetration) speed of the oxalato borate complex (typically a complex ion such as $[B(C_2O_4)_2]^-$) in the wound electrode body is slower than that of the Na component (Na ion). Therefore, in the region near the center of the wound electrode body in the winding axial direction, the concentration of the Na component (Na ion) increases due to the impregnation of the nonaqueous electrolytic solution. Next, when the oxalato borate complex reaches the region subsequently, an insoluble sodium salt (for example, sodium bis(oxalato)borate; $Na[B(C_2O_4)_2]$; hereinafter referred to as "NaBOB") of the oxalato borate complex is preferentially formed. As a result, it is difficult to form a desired solid electrolyte interface film, or the formation amount of the film significantly decreases.

Therefore, the present inventors thought that the increase in the concentration of the Na component in the wound electrode body, particularly, in the center region thereof in the winding axial direction is prevented by delaying the movement (penetration) speed of the unavoidable Na component in the wound electrode body in the winding axial direction; as a result, the formation of a large amount of the insoluble oxalato borate complex sodium salt such as NaBOB in the region is prevented such that the non-uniformity in the formation of the solid electrolyte interface film is suppressed. The present inventors found that, particularly, the impregnation speed of the nonaqueous electrolytic solution from the end portions of the wound electrode body on the positive electrode current collector side in the winding axial direction (the above-described width direction) has a strong relationship with the increase in the concentration of the Na component in the center region of the wound electrode body in the winding axial direction. Thus, the present inventors found that the increase in the concentration of the Na component in the center region in the winding axial direction can be efficiently suppressed by controlling the impregnation speed of the nonaqueous electrolytic solution from the end portions on the positive electrode current collector side. Further, the present inventors found that the impregnation speed of the nonaqueous electrolytic solution from the end portions on the positive electrode current collector side can be controlled by defining a specular gloss of the sheet longitudinal direction and a specular gloss of the width direction to be predetermined ranges in the elongated sheet-shaped positive electrode current collector foil constituting the positive electrode current collector of the wound electrode body; as a result, the increase in the concentration of the Na component in the center region of the wound electrode body in the winding axial direction can be sufficiently suppressed. Based on this finding, the invention has been completed.

According to a first aspect of the invention, there is provided a nonaqueous electrolyte secondary battery including: a wound electrode body; a nonaqueous electrolytic solution; and a case. The wound electrode body is formed by laminating an elongated sheet-shaped positive electrode current collector foil, an elongated sheet-shaped negative electrode current collector foil, and an elongated sheet-shaped separator to obtain a laminate and winding the obtained laminate. The positive electrode current collector foil has a surface on which a positive electrode active material layer containing a positive electrode active material is formed. The negative electrode current collector foil has a surface on which a negative electrode active material layer containing a negative electrode active material is formed. The case accommodates the wound electrode body and the nonaqueous electrolytic solution. A solid electrolyte interface film derived from an oxalato borate complex is formed on at least a surface of the negative electrode active material layer. The positive electrode current collector foil satisfies the following conditions of (a) $700\% \leq \alpha \leq 760\%$ and (b) $530\% \leq \beta \leq 590\%$. $\alpha$ represents a 60-degree specular gloss in a direction parallel to a longitudinal direction of the positive electrode current collector foil. $\beta$ represents a 60-degree specular gloss in a width direction perpendicular to the longitudinal direction of the positive electrode current collector foil. "Specular gloss" described in this specification refers to the specular gloss Gs ($\theta$) at an incident angle $\theta$ which is calculated using a measurement method according to JIS Z 8741:1997. Accordingly, "60-degree specular gloss" and "20-degree specular gloss" can also be expressed as "Gs (60°)" and "Gs (20°)". Specifically, on a glass surface having a constant refractive index value of 1.567 over the entire visual wavelength region, a specular gloss at a predetermined incident angle $\theta$ (typically, $\theta=60°$ or $\theta=20°$) is set as a reference value of 100(%). Based on the reference value, a measurement surface of a desired sample material is measured under the same conditions to obtain a specular gloss value (%). A measuring device which measures the specular gloss Gs ($\theta$) using the measurement method according to JIS Z 8741:1997 is commercially available from various manufacturers. Using this measuring device, "60-degree specular gloss" and "20-degree specular gloss" can be easily measured without a particular detailed understanding of the measurement principle.

In the nonaqueous electrolyte secondary battery disclosed herein, the wound electrode body is formed such that the positive electrode current collector foil constituting the wound electrode body satisfies the above-described optical conditions, that is, the 60-degree specular gloss $\alpha$ in the direction parallel to a longitudinal direction of the positive electrode current collector foil and the 60-degree specular gloss $\beta$ in the width direction perpendicular to the longitudinal direction of the positive electrode current collector foil satisfy $700\% \leq \alpha \leq 760\%$ and $530\% \leq \beta \leq 590\%$, respectively. As a result, while securing superior binding properties between the positive electrode active material layer and the positive electrode current collector foil, the impregnation speed of the nonaqueous electrolytic solution impregnated into the electrode body from end portions (in particular, end portions on the positive electrode current collector side) of the wound electrode body in the winding axial direction (the width direction) can be delayed, and the biased presence of a high concentration of Na component in a center region of the wound electrode body in the winding axial direction can be suppressed. Accordingly, the formation of a large amount of an insoluble oxalato borate complex sodium salt such as NaBOB in the center region is prevented. As a result, non-uniformity in the formation of a solid electrolyte interface film derived from an oxalato borate complex can be efficiently suppressed. Accordingly, according to the nonaqueous electrolyte secondary battery having the above-described configuration, the solid electrolyte interface film derived from an oxalato borate complex can be formed on the entire negative electrode active material layer of the wound electrode body while suppressing the formation non-uniformity. Therefore, high durability (for example, capacity retention or output performance after a durability test) can be realized.

In the above-described aspect, the positive electrode current collector foil may be aluminum foil having an overall arithmetic average roughness of 0.08 μm to 0.12 μm. In this kind of nonaqueous electrolyte secondary battery, aluminum foil is generally used as a positive electrode current collector foil. In the wound electrode body including the positive electrode current collector foil that is aluminum foil having an overall arithmetic average roughness of 0.08 μm to 0.12 μm and is configured such that the 60-degree specular gloss α and the 60-degree specular gloss β are in the above-described numerical value range, the impregnation speed of the nonaqueous electrolytic solution impregnated into the electrode body from end portions (in particular, end portions on the positive electrode current collector side) of the wound electrode body in the winding axial direction can be preferably delayed while securing superior binding properties between the positive electrode active material layer and the positive electrode current collector foil.

In the above-described aspect, the oxalato borate complex may be lithium bis(oxalato)borate (LiBOB). In the nonaqueous electrolyte secondary battery according to the above-described aspect, the biased presence of the unavoidable Na component in the center region of the wound electrode body in the winding axial direction is suppressed, and a chemically stable solid electrolyte interface film derived from LiBOB is formed on the surface of the negative electrode active material layer. Therefore, in the nonaqueous electrolyte secondary battery according to the above-described aspect, superior durability (for example, output performance after a durability test) can be realized.

A battery pack may be configured by electrically connecting the plural nonaqueous electrolyte secondary batteries according to the above-described aspect to each other. In the battery pack, all the single cells (each of which is a nonaqueous electrolyte secondary battery constituting the battery pack; hereinafter, the same shall be applied) are configured using the nonaqueous electrolyte secondary battery (for example, a lithium ion secondary battery) disclosed herein. Therefore, particularly high durability performance can be maintained. Therefore, the battery pack according to the invention can be preferably used as a high-output power supply for driving a vehicle.

According to a second aspect of the invention, a method of manufacturing a nonaqueous electrolyte secondary battery includes: forming a wound electrode body by laminating an elongated sheet-shaped positive electrode current collector foil, an elongated sheet-shaped negative electrode current collector foil, and an elongated sheet-shaped separator to obtain a laminate and winding the obtained laminate. The positive electrode current collector foil has a surface, on which a positive electrode active material layer containing a positive electrode active material is formed, and is adjusted to satisfy the following conditions of (a) 700%≤α≤760% and (b) 530%≤β≤590%. α represents a 60-degree specular gloss in a direction parallel to a longitudinal direction of the positive electrode current collector foil. β represents a 60-degree specular gloss in a width direction perpendicular to the longitudinal direction of the positive electrode current collector foil. The negative electrode current collector foil has a surface on which a negative electrode active material layer containing a negative electrode active material is formed. The method further includes: accommodating a nonaqueous electrolytic solution and the wound electrode body in a battery case and impregnating the wound electrode body with the nonaqueous electrolytic solution from an end portion of the wound electrode body in a width direction perpendicular to a longitudinal direction of the wound electrode body. The nonaqueous electrolytic solution contains an oxalato borate complex capable of forming a solid electrolyte interface film on at least a portion of the negative electrode active material layer after charging. In the method having the above-described configuration, the nonaqueous electrolyte secondary battery according to the invention which exhibits the above-described effects can be manufactured.

In the above-described aspect, the positive electrode current collector foil may be aluminum foil having an overall arithmetic average roughness of 0.08 μm to 0.12 μm.

In the above-described aspect, the nonaqueous electrolytic solution may contain a lithium bis(oxalato)borate (Li-BOB) as the oxalato borate complex. By using these materials, a preferable nonaqueous electrolyte secondary battery such as a lithium ion secondary battery having superior durability performance can be manufactured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Preferred embodiments of the invention are described below. Matters necessary to implement the secondary battery other than those specifically referred to in this description may be understood as design matters based on the related art in the pertinent field for a person of ordinary skills in the art. The invention can be practiced based on the contents disclosed in this description and common technical knowledge in the subject field. In this specification, "nonaqueous electrolyte secondary battery" refers to a secondary battery including a nonaqueous electrolytic solution (an electrolytic solution containing a supporting electrolyte in a nonaqueous solvent), and typical examples thereof include a "lithium ion secondary battery" in which charge carriers are lithium ions.

Figure 1:
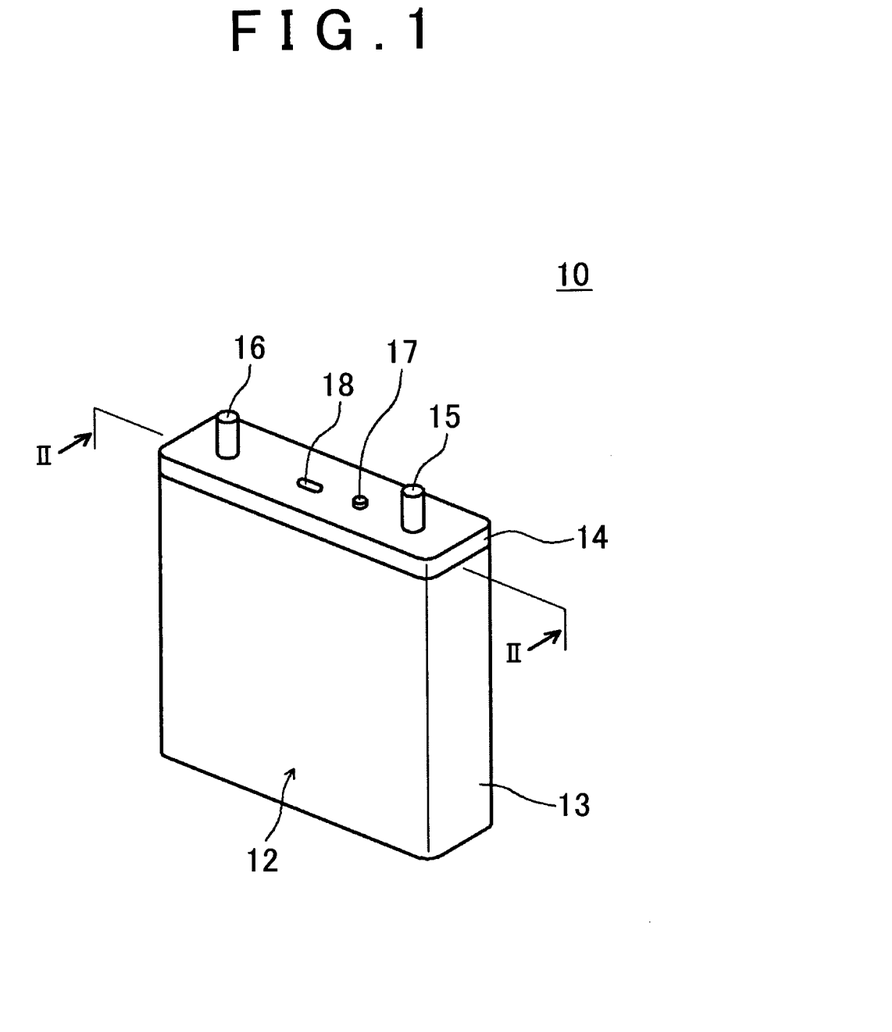
FIG. 1 is a perspective view schematically showing the external appearance of a nonaqueous electrolyte secondary battery (lithium ion secondary battery) according to an embodiment of the invention.
Figure 2:
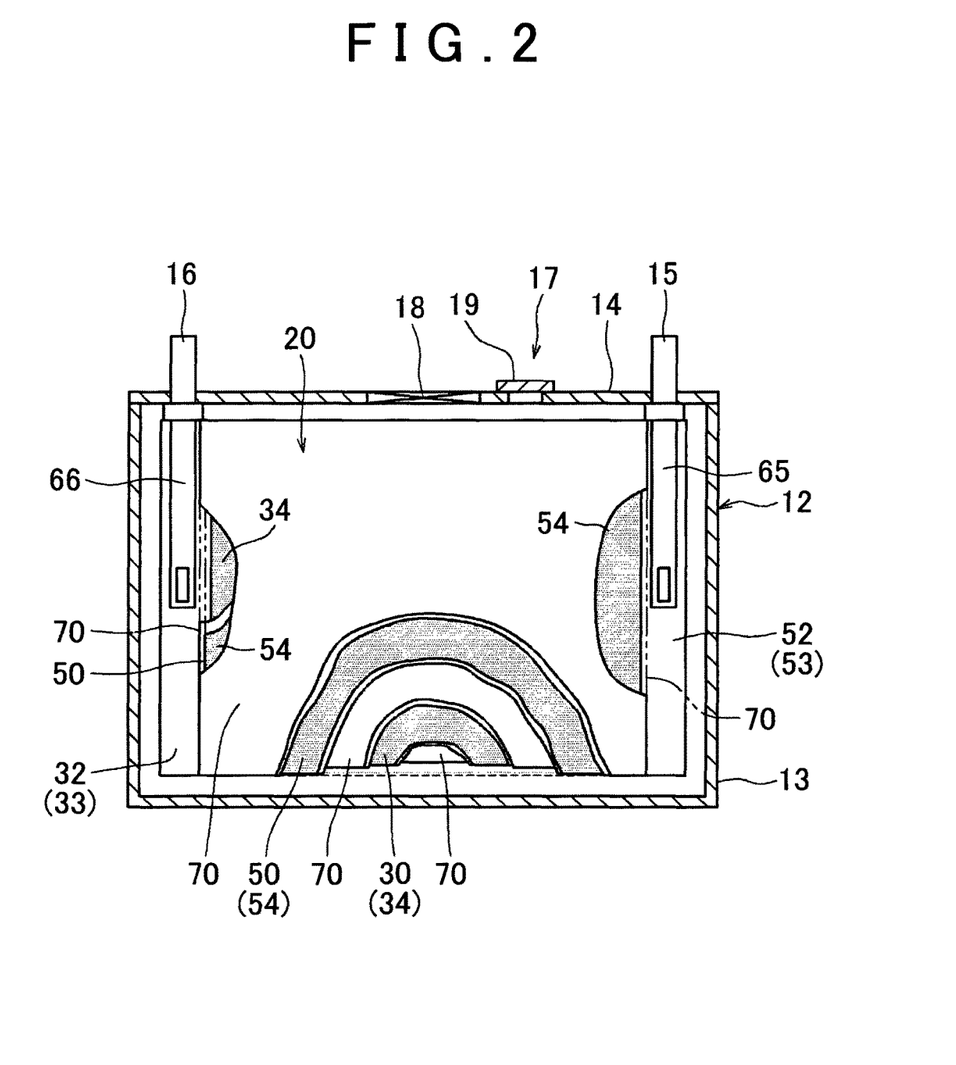
FIG. 2 is a cross-sectional view taken along line II-II of FIG. 1.
Figure 3:
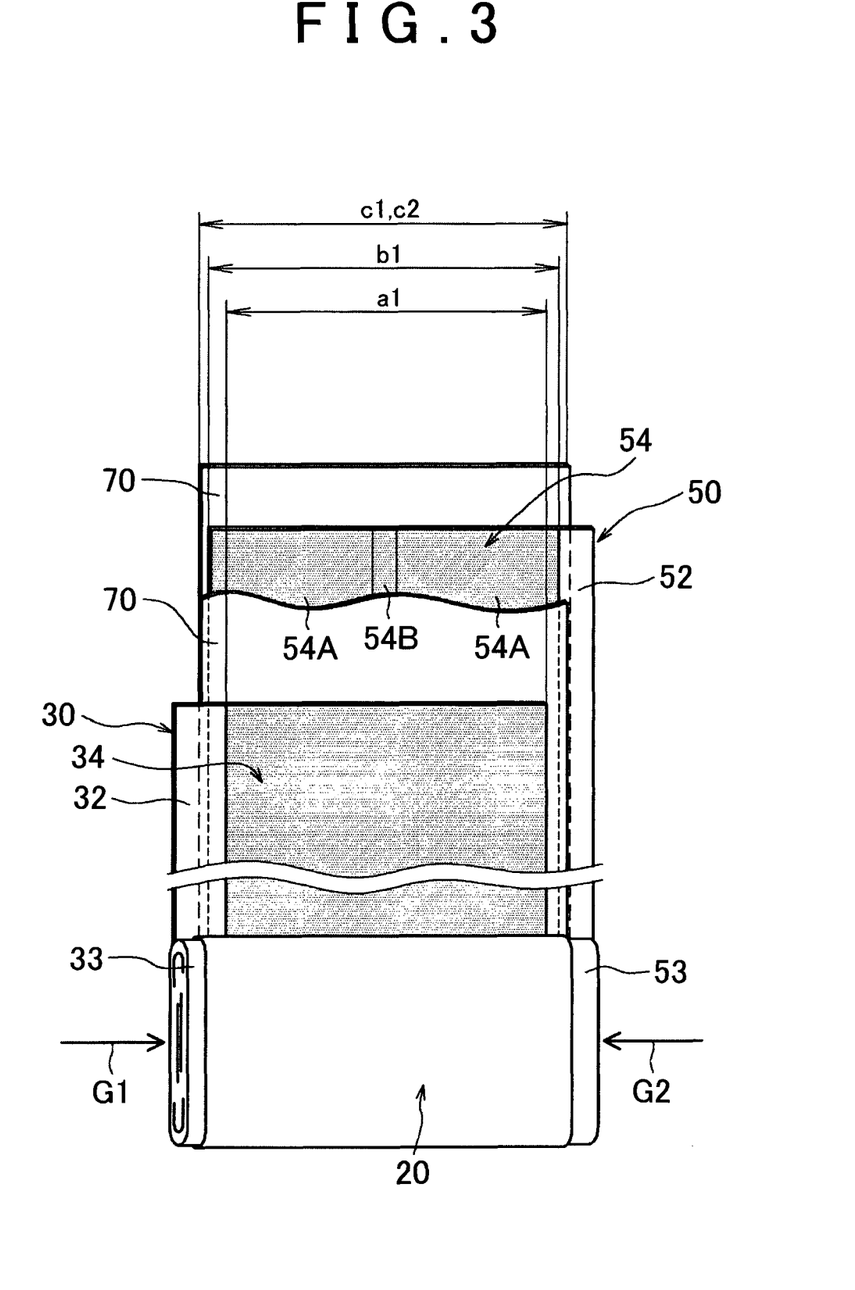
FIG. 3 is a schematic diagram showing a configuration of a wound electrode body according to the embodiment.

First, a lithium ion secondary battery 10 which is a preferable embodiment of a nonaqueous electrolyte secondary battery according to the invention will be described with reference to FIGS. 1 to 3. As shown in FIG. 1, the nonaqueous electrolyte secondary battery (lithium ion secondary battery) 10 according to the embodiment includes a battery case 12 including: a case body 13 having flat cuboid shape (square shape); and a lid 14 that covers an opening of the case body 13. In the battery case 12, a wound electrode body 20 (FIG. 2) and a nonaqueous electrolytic solution which are described below are accommodated. On the top surface (that is, the lid 14) of the battery case 12, a positive electrode terminal 16 and a negative electrode terminal 15 are provided for external connection such that portions of the terminals protrude from the lid 14 to the outside of the battery 10. The lid 14 further includes a safety valve 18 for discharging gas, produced from the inside of the battery case 12, to the outside of the battery case 12. The nonaqueous electrolyte secondary battery 10 having the above-described configuration is constructed as follows. For example, the wound electrode body 20 is accommodated in the battery case 12 through the opening of the case body 13, the lid 14 is attached to the opening of the case body 13, the nonaqueous electrolytic solution is injected into the battery case 12 through an injection hole 17 provided on the lid 14, and the injection hole 17 is sealed with a predetermined sealing member 19. As a result, the lithium ion secondary battery 10 is constructed.

Next, the wound electrode body 20 according to the embodiment accommodated in the battery case 12 will be described with reference to the drawings. As shown in FIGS. 2 and 3, the wound electrode body 20 accommodated in the battery case 12 is formed by laminating a positive electrode sheet 30, a negative electrode sheet 50, and two elongated sheet-shaped separators to obtain a laminate in order of the positive electrode, the separator, the negative electrode, and the separator to obtain a laminate and winding the laminate in a flat elliptical shape (or winding the laminate in a cylindrical shape and then pressing side surfaces thereof to be squashed in a flat shape). In the positive electrode sheet 30, a positive electrode active material layer 34 is formed on opposite surfaces of an elongated sheet-shaped positive electrode current collector foil 32 in a sheet longitudinal direction. In the negative electrode sheet 50, a negative electrode active material layer 54 is formed on opposite surfaces of an elongated sheet-shaped negative electrode current collector foil 52 in the sheet longitudinal direction. As shown in FIG. 3, a size b1 of the negative electrode active material layer 54 in the width direction is slightly larger than a size a1 of the positive electrode active material layer 34 in the width direction (b1>a1). Further, sizes c1 and c2 of the separator 70 in the width direction are larger than the width b1 of the negative electrode active material layer 54.

One end portion of the positive electrode sheet 30 in the width direction perpendicular to the sheet longitudinal direction configures a positive electrode current collector foil exposure end portion 33 where the positive electrode active material layer 34 is not provided in the sheet longitudinal direction. Likewise, one end portion of the negative electrode sheet 50 (that is, the end portion on the opposite side to the positive electrode current collector foil exposure end portion 33) in the width direction perpendicular to the sheet longitudinal direction configures a negative electrode current collector foil exposure end portion 53 where the negative electrode active material layer 54 is not provided in the sheet longitudinal direction. A positive electrode current collector plate 66 is provided in the exposure end portion 33 of the positive electrode current collector foil 32, and a negative electrode current collector plate 65 is provided in the exposure end portion 53 of the negative electrode current collector foil 52. The positive electrode current collector plate 66 and the negative electrode current collector plate 65 are electrically connected to the positive electrode terminal 16 and the negative electrode terminal 15, respectively.

Next, the positive electrode current collector foil 32 constituting the wound electrode body 20 according to the embodiment will be described in detail. The positive electrode current collector foil 32 of the wound electrode body 20 may be formed of a metal material having high conductivity which is preferable as a positive electrode current collector foil for a lithium ion secondary battery, and examples thereof include aluminum, nickel, titanium, and stainless steel. In particular, aluminum foil is preferable. The thickness of the positive electrode current collector foil 32 is not particularly limited and is preferably 5 µm to 50 µm and more preferably 8 µm to 30 µm in consideration of a balance between the capacity density of the battery and the strength of the current collector.

Figure 5:
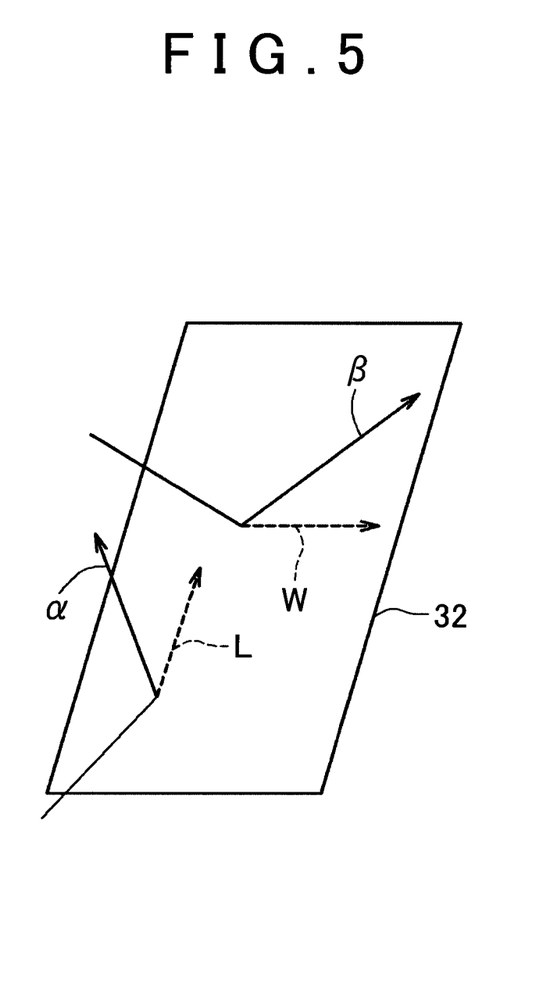
FIG. 5 is a diagram schematically showing a measurement direction of a specular gloss of a current collector foil.

As described above in the nonaqueous electrolyte secondary battery disclosed herein, the metal foil (typically, aluminum foil) having an elongated sheet shape is prepared as the elongated sheet-shaped positive electrode current collector foil such that, in the state of the constructed wound electrode body 20, as schematically shown in FIG. 5, a 60-degree specular gloss $\alpha$ in a direction L parallel to the longitudinal direction of the positive electrode current collector foil 32 and a 60-degree specular gloss $\beta$ in a width direction W perpendicular to the longitudinal direction can satisfy $700\% \leq \alpha \leq 760\%$ and $530\% \leq \beta \leq 590\%$, respectively. From the viewpoint of securing superior binding properties between the positive electrode current collector foil and the positive electrode active material layer, the overall arithmetic average roughness (Ra) of the surface of the metal foil is preferably 0.08 µm to 0.12 µm.

The specular glosses $\alpha$ and $\beta$ of the positive electrode current collector foil (metal foil) 32 in the two directions L and W are defined as described above. As a result, during the construction of the lithium ion secondary battery (nonaqueous electrolyte secondary battery) 10, the impregnation speed of the nonaqueous electrolytic solution into the electrode body (that is, directions indicated by Symbols G1 and G2 in FIG. 3) from the end portions 33 and 53 of the wound electrode body 20 in the winding axial direction can be delayed to a suitable degree. In particular, the impregnation speed of the nonaqueous electrolytic solution into the electrode body (in the direction indicated by Symbol G1 in FIG. 3) from the positive electrode current collector foil exposure end portion 33 where the positive electrode active material layer 34 is not formed can be suitably controlled. Accordingly, the biased presence of a high concentration of a Na component, which is unavoidably present in the center region of the wound electrode body 20 in the width direction, that is, in the winding axial direction (for example, in FIG. 3, a region indicated by Symbol 54B in the negative electrode active material layer 54), is suppressed, and the formation of a large amount of an insoluble oxalato borate complex sodium salt such as NaBOB in the center region 54B is suppressed. As a result, a SEI film derived from an oxalato borate complex (typically, LiBOB) having substantially no formation non-uniformity can be formed over the entire regions 54A and 54B of the negative electrode active material layer 54.

For example, when the 60-degree specular gloss $\alpha$ in the direction L parallel to the longitudinal direction of the positive electrode current collector foil 32 is excessively less than 700%, the orientation of the roughness in the width direction W is relatively low, and the impregnation speed of the nonaqueous electrolytic solution is improved. Therefore, due to the formation non-uniformity of the SEI film, the output performance after a durability test of the battery relatively decreases, which is not preferable. On the other hand, when 60-degree specular gloss α is excessively more than 760%, the binding properties of the positive electrode active material layer 34 to the positive electrode current collector foil 32 decrease, and the initial resistance value increases, which is not preferable. In addition, when the 60-degree specular gloss β in the width direction W perpendicular to the longitudinal direction of the positive electrode current collector foil 32 is excessively less than 530%, the orientation of the roughness in the width direction W increases. However, the binding properties of the positive electrode active material layer 34 to the positive electrode current collector foil 32 decrease, and the initial resistance value increases, which is not preferable. On the other hand, when the 60-degree specular gloss β is excessively more than 590%, the orientation of the roughness in the width direction W is relatively low, and the impregnation speed of the nonaqueous electrolytic solution is improved. Therefore, due to the formation non-uniformity of the SEI film, the output performance after a durability test of the battery relatively decreases, which is not preferable.

The metal foil (for example, aluminum foil) which realizes the above-described 60-degree specular glosses can be manufactured by appropriately adjusting rolling conditions of the related art, for example during the formation of the metal foil (for example, by adjusting a fine uneven surface shape of a rolling mill roll or a rolling pressure). In the embodiment of the invention, an elongated sheet-shaped metal foil (for example, aluminum foil) for the positive electrode current collector foil which satisfies the above-described 60-degree specular glosses α and β may be appropriately prepared during the formation of the wound electrode body. However, since there is no relationship with the method of forming the metal foil, the details thereof will not be described.

As described above, the object of the invention can be realized by defining the specular glosses α and β in the two directions of the elongated sheet-shaped positive electrode current collector foil 32. Hereinafter, other components (materials) used to manufacture the lithium ion secondary battery 10, which is the preferable embodiment of the nonaqueous electrolyte secondary battery disclosed herein, and the manufacturing process of the lithium ion secondary battery 10 will be simply described. However, the invention is not limited to the materials and the process described below.

The positive electrode sheet 30 of the lithium ion secondary battery 10 disclosed herein includes: the positive electrode current collector foil 32 that is prepared so as to satisfy the above-described glosses α and β; and the positive electrode active material layer 34 that is formed on the surface of the positive electrode current collector foil 32 and contains at least the positive electrode active material. In addition to the predetermined positive electrode active material, optionally, the positive electrode active material layer 34 may further contain optional components such as a conductive material and a binder. As the positive electrode active material, a lithium-containing compound (for example, lithium transition metal composite oxide) containing lithium and one kind or two or more kinds of transition metal elements can be preferably used, in which the lithium-containing compound is a material capable of storing and releasing lithium ions. Examples of the positive electrode active material include lithium nickel composite oxide (for example, $LiNiO_2$), lithium cobalt composite oxide (for example, $LiCoO_2$), lithium manganese composite oxide (for example, $LiMn_2O_4$), and a ternary lithium-containing composite oxide such as lithium nickel cobalt manganese composite oxide (for example, $LiNi_{1/3}Co_{1/3}Mn_{1/3}O_2$). In addition, as the positive electrode active material, a polyanion-based compound (for example, $LiFePO_4$, $LiMnPO_4$, $LiFeVO_4$, $LiMnVO_4$, $Li_2FeSiO_4$, $Li_2MnSiO_4$, or $Li_2CoSiO_4$) represented by a formula of $LiMPO_4$, $LiMVO_4$, or $Li_2MSiO_4$ (wherein M represents at least one element selected from among Co, Ni, Mn, and Fe) may be used.

The conductive material is not particularly limited to a specific conductive material as long as it is used in a lithium ion secondary battery of the related art. For example, a carbon material such as carbon powder or carbon fiber can be used. As the carbon powder, for example, carbon powders of various carbon blacks (for example, acetylene black, furnace black, and Ketjen black) and graphite powder can be used. Among these, powder of acetylene black (AB) is preferably used as the carbon powder. Among these conductive materials, one kind can be used alone, or two or more kinds can be appropriately used in combination.

As the binder, binders which are used in a positive electrode of a common lithium ion secondary battery can be appropriately used. For example, when a solvent-based paste composition (including a slurry composition and an ink composition) is used as a composition for forming the positive electrode mixture layer, a polymer material which is dissolved in an organic solvent (nonaqueous solvent), for example, polyvinylidene fluoride (PVdF) or polyvinylidene chloride (PVdC) can be used. In particular, PVdF is preferably used. Alternatively, when an aqueous paste composition is used, a water-soluble (dispersible in water) polymer material or a water-dispersible (dispersible in water) polymer material can be preferably used. Examples of the water-soluble or water-dispersible polymer include polytetrafluoroethylene (PTFE), carboxymethyl cellulose (CMC), and styrene-butadiene rubber (SBR). The above-described exemplary polymer materials may be used not only as the binder but also as a thickener of the above-described composition or other additives.

Here, "solvent-based paste composition" refers to a composition in which a dispersion medium for the positive electrode active material contains an organic solvent (nonaqueous solvent) as a major component. As the organic solvent, for example, N-methyl-2-pyrrolidone (NMP) can be preferably used. Here, "aqueous paste composition" refers to a composition in which a dispersion medium for the positive electrode active material is water or a mixed solvent containing water as a major component. As a solvent constituting the mixed solvent other than water, one kind or two or more kinds of organic solvents (for example, lower alcohols or lower ketones) which can be uniformly mixed with water can be appropriately selected and used. The positive electrode sheet 30 can be suitably manufactured using such a material substantially in the following procedure. That is, for example, the positive electrode active material, the conductive material, and the binder which is soluble in the organic solvent are dispersed in the organic solvent to prepare a paste composition for forming the positive electrode active material layer (hereinafter, referred to as "positive electrode mixture"). The prepared positive electrode mixture is applied to the positive electrode current collector foil 32, is dried, and is pressed. As a result, the positive electrode sheet 30 can be prepared that includes: the positive electrode current collector foil 32; and the positive electrode active material layer 34 that is formed on the positive electrode current collector foil 32. From the viewpoint of realizing high energy density, a ratio of the mass of the positive electrode active material to the total mass of the positive electrode active material layer 34 is suitably about 60 mass % or more (typically, 60 mass % to 95 mass %) and is usually preferably about 70 mass % to 95 mass %. From the viewpoint of securing suitable mechanical strength (shape retaining ability), a ratio of the mass of the binder to the total mass of the positive electrode active material layer 34 is, for example, 0.1 mass % to 10 mass % and is usually preferably 0.2 mass % to 5 mass %. From the viewpoint of simultaneously improving output characteristics and energy density at a high level, a ratio of the mass of the conductive material to the total mass of the positive electrode active material layer 34 is, for example, 1 mass % to 20 mass % and is usually preferably 2 mass % to 10 mass %.

In addition, the thickness of the positive electrode active material layer 34 after being pressed is, for example, 20 μm or more (typically, 50 μm or more) and is, for example, 200 μm or less (typically, 100 μm or less). In addition, the density of the positive electrode active material layer 34 is not particularly limited, but is, for example, 1.5 g/cm$^3$ or more (typically, 2 g/cm$^3$ or more) and is, for example, 4.5 g/cm$^3$ or less (typically, 4.2 g/cm$^3$ or less). The positive electrode active material layer 34 having the above-described configuration can realize high battery performance (for example, high energy density and output density). The constituent materials of the positive electrode sheet 30 prepared as described above may unavoidably contain a Na component.

The negative electrode sheet 50 of the lithium ion secondary battery 10 disclosed herein includes: the negative electrode current collector foil 52; and the negative electrode active material layer 54 that is formed on the surface of the negative electrode current collector 52 and contains at least the negative electrode active material. In addition to the negative electrode active material, optionally, the negative electrode active material layer 54 may further contain optional components such as a binder and a thickener. As the negative electrode current collector foil 52, a conductive member formed of a highly conductive metal is preferably used as in the case of a current collector foil which is used in a negative electrode for a lithium ion secondary battery of the related art. For example, copper or an alloy containing copper as a major component can be used. The thickness of the negative electrode current collector foil is not particularly limited and is preferably 5 μm to 50 μm and more preferably 8 μm to 30 μm in consideration of a balance between the capacity density of the battery and the strength of the current collector.

As the negative electrode active material, one material or two or more materials selected from among materials which are used for a lithium ion secondary battery in the related art may be used without any particular limitation. Examples of the negative electrode active material include a particulate (spherical or flaky) carbon material at least partially containing a graphite structure (layered structure), a lithium transition metal composite oxide (for example, a lithium titanium composite oxide such as $Li_4Ti_5O_{12}$), and a lithium transition metal composite nitride. Examples of the carbon material include natural graphite, artificial graphite, non-graphitizable carbon (hard carbon), and graphitizable carbon (soft carbon). As the binder, binders which are used in a negative electrode of a common lithium ion secondary battery can be appropriately used. For example, when the aqueous paste composition is used to form the negative electrode active material layer, a water-soluble polymer material or a water-dispersible polymer material can be preferably used. Examples of the water-dispersible polymer include rubbers such as styrene-butadiene rubber (SBR); and polyethylene oxide (PEO) and vinyl acetate copolymers. Since sodium hydroxide may be used as a neutralizer in SBR, SBR may contain a Na component as an unavoidable impurity. As the thickener, for example, a water-soluble or a water-dispersible polymer can be used. Examples of the water-soluble polymer include cellulose polymers such as carboxymethyl cellulose (CMC), methyl cellulose (MC), cellulose acetate phthalate (CAP), and hydroxypropyl methylcellulose (HPMC); and polyvinyl alcohol (PVA). In addition, the same materials described above as the examples of the binder can be appropriately used.

The negative electrode sheet 50 can be suitably manufactured using such a material substantially in the following procedure. That is, for example, the negative electrode active material and other components (for example, the binder and the thickener) are dispersed in an appropriate solvent (for example, water) to prepare a paste composition for forming the negative electrode active material layer (hereinafter, referred to as "negative electrode mixture"). The prepared negative electrode mixture is applied to the negative electrode current collector foil 52, is dried, and is pressed. As a result, the negative electrode sheet 50 can be prepared that includes: the negative electrode current collector foil 52; and the negative electrode active material layer that 54 that is formed on the negative electrode current collector foil 52. A ratio of the mass of the negative electrode active material to the total mass of the negative electrode active material layer 54 is preferably about 60 mass % or more (typically, 60 mass % to 99 mass %). From the viewpoint of securing suitable mechanical strength (shape retaining ability), a ratio of the mass of the binder to the total mass of the negative electrode active material layer 54 is, for example, 1 mass % to 10 mass % and is usually preferably 1 mass % to 5 mass %. From the viewpoint of realizing suitable durability, a ratio of the mass of the thickener to the total mass of the negative electrode active material layer 54 is, for example, 1 mass % to 10 mass % and is usually preferably 1 mass % to 5 mass %.

The thickness of the negative electrode active material layer 54 after being pressed is, for example, 20 μm or more (typically, 50 μm or more) and is, for example, 200 μm or less (typically, 100 μm or less). In addition, the density of the negative electrode active material layer 54 is not particularly limited, but is, for example, 0.5 g/cm$^3$ to 2 g/cm$^3$ (typically, 1 g/cm3 to 1.5 g/cm$^3$). The negative electrode active material layer 54 having the above-described configuration can realize high battery performance (for example, high energy density and output density). The constituent materials of the negative electrode sheet 50 prepared as described above may unavoidably contain a Na component.

As the elongated sheet-shaped separator 70, a well-known microporous sheet of the related art can be used without any particular limitation. Examples of the separator 70 include a porous resin sheet (for example, a film or a non-woven fabric) formed of a resin such as polyethylene (PE), polypropylene (PP), polyester, cellulose, or polyamide. The porous resin sheet may have a single-layer structure or a multilayer structure including two or more layers (for example, a three-layer structure in which a PP layer is laminated on both surfaces of a PE layer). A porous heat resistance layer may be provided on a single surface or both surfaces (typically, a single surface) of the porous resin sheet. It is preferable that the thickness of the separator is set in a range of, for example, 10 μm to 40 μm. In many cases, the separator includes a sodium component as a plasticizer.

When the separator is impregnated with the nonaqueous electrolytic solution, the nonaqueous electrolytic solution may contain a Na component.

The wound electrode body 20 is formed using the positive electrode sheet 30, the negative electrode sheet 50, and the separator 70 prepared as described above. That is, as shown in FIG. 3, the positive electrode sheet 30 and the negative electrode sheet 50 are laminated with the two separators 70 interposed therebetween, and the obtained laminate is wound in the longitudinal direction. In other words, this laminate is wound with the width direction, perpendicular to the sheet longitudinal direction, set as a winding axis. As a result, the cylindrical wound electrode body 20 can be obtained. By pressing the obtained wound electrode body 20 to be squashed from the side surface direction thereof, the desired flat wound electrode body 20 can be formed. Alternatively, the wound electrode body 20 may be initially wound in a flat shape. During the lamination of the positive electrode sheet 30, the negative electrode sheet 50, and the separator 70, the positive electrode sheet 30 and the negative electrode sheet 50 overlap each other after being slightly shifted from each other in the width direction such that such that the positive electrode current collector foil exposure end portion 33 of the positive electrode sheet 30 and the negative electrode current collector foil exposure end portion 53 of the negative electrode sheet 50 protrude from opposite sides of the separator 70 in the width direction to different sides, respectively. As a result, the positive electrode current collector foil exposure end portion 33 and the negative electrode current collector foil exposure end portion 53 protrude to the outside from winding core portions (that is, portions where the positive and negative electrode active material layers 34, 54 face each other) in the winding axial direction of the wound electrode body 20. The positive electrode current collector plate 66 and the negative electrode current collector plate 65 are joined by welding to the positive electrode current collector foil exposure end portion 33 and the negative electrode current collector foil exposure end portion 53, respectively. The current can be collected with high efficiency.

As the nonaqueous electrolytic solution, the same nonaqueous electrolytic solution as that used for such a nonaqueous electrolyte secondary battery (lithium ion secondary battery) 10 in the related art may be used without any particular limitation. Typically, the nonaqueous electrolytic solution has a composition in which an appropriate nonaqueous solvent contains a supporting electrolyte. Examples of the nonaqueous solvent include ethylene carbonate (EC), propylene carbonate (PC), dimethyl carbonate (DMC), diethyl carbonate (DEC), and ethyl methyl carbonate (EMC). Examples of the supporting electrolyte include a lithium salt such as $LiPF_6$, $LiBF_4$, $LiAsF_6$, $LiCF_3SO_3$, $LiC_4F_9SO_3$, $LiN(CF_3SO_2)_2$, or $LiC(CF_3SO_2)_3$. For example, a nonaqueous electrolytic solution in which a mixed solvent of EC and DEC (for example, volume ratio=1:1) contains $LiPF_6$ in a concentration of about 1 mol/L may be used as a preferable example.

The nonaqueous electrolytic solution may contain various oxalato borate complexes. Preferable examples of the oxalato borate complexes include lithium bis(oxalato)borate (LiBOB) represented by the following formula (I). LiBOB is preferable because a SEI film having high stability can be formed on the surface of the negative electrode active material layer 54 (strictly, the negative electrode active material contained in the negative electrode active material layer 54).

Examples of the oxalato borate complex other than LiBOB include a complex compound represented by the following formula (II) or (III). In the formula (II), $R_1$ and $R_2$ can be each independently selected from halogen atoms (F, Cl, Br) and a perfluoroalkyl group having 1 to 10 carbon atoms (preferably 1 to 3 carbon atoms). In the formulae (II) and (III), $A^+$ may be either an inorganic cation or an organic cation. Specific examples of the inorganic cation include cations of alkali metals such as Li, Na, and K, cations of alkali earth metals such as Be, Mg, and Ca, cations of metals of Ag, Zn, Cu, Co, Fe, Ni, Mn, Ti, Pb, Cr, V, Ru, Y, lanthanoid, and actinide, and a proton. Specific examples of the organic cation include tetraalkylammonium ions such as a tetrabutylammonium ion, a tetraethylammonium ion, and a tetramethylammonium ion; trialkylammonium ions such as a triethylmethylammonium ion and a triethylammonium ion; and a pyridinium ion, an imidazolium ion, a tetraethylphosphonium ion, a tetramethylphosphonium ion, a tetraphenylphosphonium ion, a triphenylsulfonium ion, and a triethylsulfonium ion. Among these cation example, a lithium ion, a tetraalkylammonium ion, or a proton is preferable.

The addition amount of the oxalato borate complex such as LiBOB is not particularly limited and is preferably 0.005 mol/L or more (more preferably 0.01 mol/L or more) and is 0.15 mol/L or less (more preferably 0.1 mol/L or less) with respect to the amount of the nonaqueous electrolytic solution. When the addition amount of the oxalato borate complex is excessively more than 0.1 mol/L, the speed of the nonaqueous electrolytic solution containing the oxalato borate complex impregnated into the electrode body may significantly decrease, which is not preferable. When the addition amount of the oxalato borate complex is excessively less than 0.005 mol/L, it is difficult to form a sufficient amount of the SEI film on the surface of the negative electrode active material layer 54, which may increase the resistance. Within a range where the effects of the invention do not deteriorate, a gas producing additive (such as biphenyl or cyclohexylbenzene) and other additives (for example, a surfactant, a dispersant, or thickener) may be added to the nonaqueous electrolytic solution in an amount of 0.01 mass % to 10 mass %.

By the battery case 12 accommodating the wound electrode body 20 and the nonaqueous electrolytic solution prepared described above, a battery assembly (that is, the battery before being initially charged) according to the embodiment can be constructed. The battery case body 13 and the lid 14 are preferably formed of metal such as aluminum, iron, or alloys thereof but may be formed of a highly heat-resistant synthetic resin such as polyamide. In the configuration shown in FIG. 2, when the battery case 12 is arranged on a horizontal plane such that the lid 14 faces upward, the wound electrode body 20 is accommodated in the battery case 12 such that the winding axial direction is a horizontal direction. The wound electrode body 20 is accommodated in the battery case 12, the lid 14 is attached to the opening of the case body 13 by welding or the like, and the opening is sealed. Next, a predetermined amount of the nonaqueous electrolytic solution is injected into the case through the injection hole 17 such that the nonaqueous electrolytic solution is impregnated into the wound electrode body 20 from the end portions of the wound electrode body in the winding axial direction (width direction). At this time, the 60-degree specular gloss $\alpha$ in the direction parallel to the longitudinal direction of the positive electrode current collector foil 32 and the 60-degree specular gloss $\beta$ in the width direction (W) perpendicular to the longitudinal direction of the positive electrode current collector foil 32 satisfy $700\% \leq \alpha \leq 760\%$ and $530\% \leq \beta \leq 590\%$, respectively. As a result, in particular, the impregnation speed of the nonaqueous electrolytic solution impregnated into the wound electrode body 20 from the positive electrode current collector foil exposure end portion 33 can be delayed. Therefore, the biased presence of a high concentration of Na component in the center region of the wound electrode body 20 (in particular, the center region 54B of the negative electrode active material layer) in the winding axial direction can be suppressed. Accordingly, the formation of a large amount of an insoluble oxalato borate complex sodium salt such as NaBOB in the center region is prevented. As a result, non-uniformity in the formation of a SEI film derived from a decomposition product of the oxalato borate complex after initial charging described below can be efficiently suppressed.

After the completion of the impregnation of the nonaqueous electrolytic solution into the wound electrode body 20, the battery assembly is initially charged to about an upper limit voltage (for example, 3.7 V to 4.1 V) during the use of the battery at a charging rate of 0.1 C to 2 C. During the initial charging, the oxalato borate complex in the wound electrode body 20 is decomposed, and the SEI film derived from the complex is formed on the surface of the negative electrode active material layer 54 (strictly, the surface of the negative electrode active material) in a preferable state where the formation non-uniformity is suppressed. After the charging, the battery assembly is discharged to a predetermined voltage (for example, 3 V to 3.2 V) at a discharging rate of 0.1 C to 1 C. It is preferable that the above-described initial charging and discharging is repeated multiple times (for example, three times). By initially charging and discharging the battery assembly as described above, the battery assembly functions as the lithium ion secondary battery (nonaqueous electrolyte secondary battery) 10 which is usable. "1 C" refers to a current value at which the battery capacity (Ah) estimated from the theoretical capacity of the positive electrode can be charged in one hour.

Figure 4:
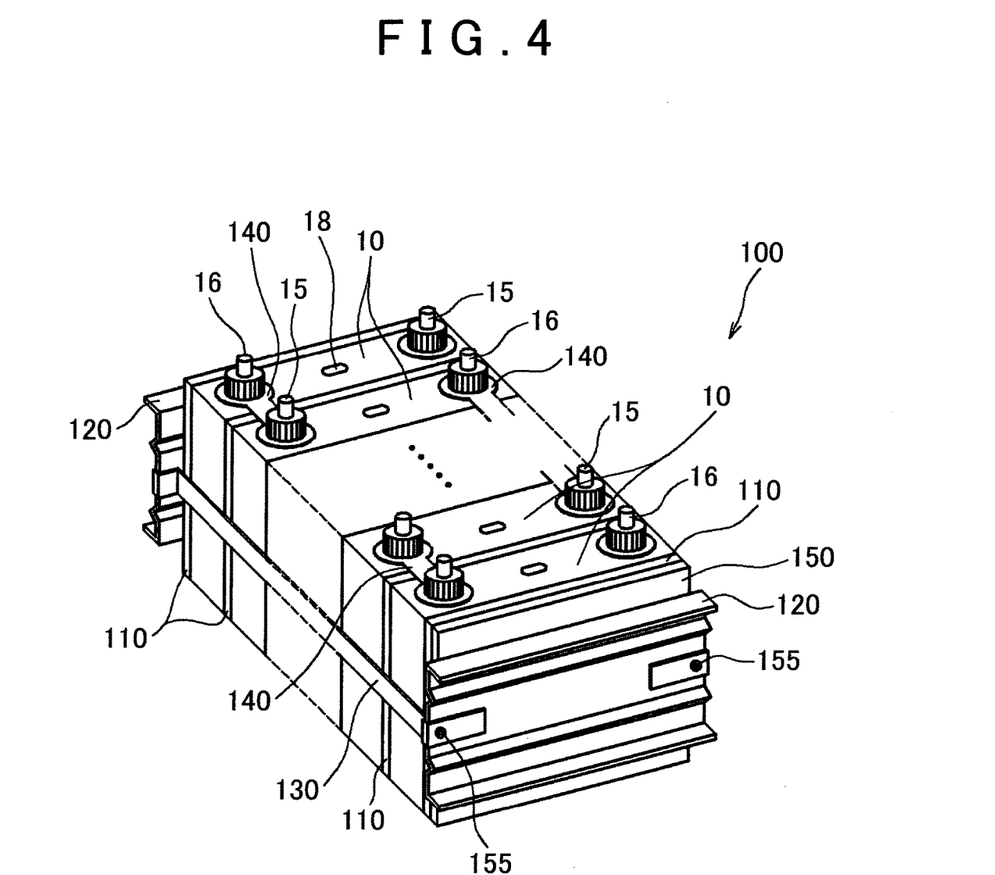
FIG. 4 is a perspective view schematically showing a battery pack which is a combination of the plural nonaqueous electrolyte secondary batteries according to the embodiment.

A battery pack 100 can be provided by combining the plural nonaqueous electrolyte secondary batteries (lithium ion secondary batteries) 10 disclosed herein to each other. In a battery pack in which plural single cells are connected to each other (typically, in series), the overall performance thereof varies depending on a single cell having the lowest performance. In the nonaqueous electrolyte secondary battery disclosed herein, the superior SEI film is formed on at least the surface of the negative electrode active material layer while suppressing the formation non-uniformity, and thus the durability performance is superior. Therefore, the battery pack can exhibit even higher battery performance. As shown in FIG. 4, in the battery pack 100 according to the embodiment, the plural (typically 10 or more and preferably 40 to 80; for example 50) lithium ion secondary batteries (single cells) 10 are reversed every second one such that the positive electrode terminals 16 and the negative electrode terminals 15 are alternately arranged, and are arranged in a direction (laminating direction) in which wide surfaces of the square battery cases 12 face each other. Cooling plates 110 having a predetermined shape are interposed between the arranged single cells 10. The cooling plate 110 functions as a heat dissipation member for efficiently dissipating heat generated from each single cell 10 during use and, preferably, has a shape capable of introducing cooling fluid (typically air) between the single cells 10 (for example, a shape in which plural parallel grooves vertically extending from one end of the rectangular cooling plate to an opposite end thereof are provided on the surface of the cooling plate 110). The cooling plate 110 is preferably formed of metal having high thermal conductivity, light-weight hard polypropylene, or another synthetic resin.

A pair of end plates (restraining plates) 120 are arranged at opposite end portions of an arranged body including the single cells 10 and the cooling plates 110 in an arrangement direction. A pair of or plural sheet-shaped spacer members 150 as length adjusting means may be interposed between the cooling plates 110 and the end plates 120. The single cells 10, the cooling plates 110, the spacer members 150 which are arranged are restrained by a restraining band 130 such that a predetermined restraining pressure is applied in the arrangement direction, the restraining band 130 being attached to bridge between the two end plates 120. Specifically, by fastening and fixing end portions of the restraining band 130 to the end plates 120 through screws 155, each single cell 10 is restrained such that a predetermined restraining pressure is applied to the arrangement direction. As a result, the restraining pressure is applied to the wound electrode body 20 which is accommodated in the battery case 12 of each single cell 10. In the adjacent two single cells 10, the positive electrode terminal 16 of one single cell is electrically connected to the negative electrode terminal 15 of another single cell through a connection member (bus bar) 140. By connecting the single cells 10 to each other in series, the battery pack 100 having a desired voltage is constructed.

Hereinafter, several examples relating to the invention will be described, but the examples are not intended to limit the invention.

[Preparation of Positive Electrode Current Collector Foil]

Plural elongated sheet-shaped positive electrode current collector foils (length in the longitudinal direction: 300 cm, length in the width direction: 10 cm, thickness: 15 μm, surface roughness (Ra): 0.08 μm to 0.12 μm) formed of aluminum foil were prepared while appropriately changing rolling conditions such as the surface of a rolling mill roll. The 60-degree specular glosses $\alpha$ and $\beta$ of the positive electrode current collector foils (Examples 1 to 4 and Comparative Examples 1 to 10) were measured using a commercially available gloss measuring device with a measurement method according to JIS Z 8741:1997. The results are shown in the corresponding item of Table 1 below.

| Sample | Specular Gloss Gs (60°) % s α | β | Addition of LiBOB | Initial Resistance mΩ | Output after Durability Test |
|---|---|---|---|---|---|
| Example 1 | 700 | 530 | Added | 1.16 | 210 |
| Example 2 | 760 | 540 | Added | 1.17 | 209 |
| Example 3 | 700 | 580 | Added | 1.17 | 210 |
| Example 4 | 750 | 590 | Added | 1.15 | 212 |
| Comparative Example 1 | 710 | 690 | Added | 1.15 | 199 |
| Comparative Example 2 | 750 | 700 | Added | 1.16 | 202 |
| Comparative Example 3 | 700 | 400 | Added | 1.25 | 200 |
| Comparative Example 4 | 760 | 420 | Added | 1.28 | 198 |
| Comparative Example 5 | 600 | 580 | Added | 1.14 | 195 |
| Comparative Example 6 | 800 | 550 | Added | 1.26 | 201 |
| Comparative Example 7 | 620 | 580 | Added | 1.15 | 194 |
| Comparative Example 8 | 810 | 590 | Added | 1.25 | 200 |
| Comparative Example 9 | 700 | 530 | Not Added | 1.01 | 188 |
| Comparative Example 10 | 710 | 690 | Not Added | 1.02 | 186 |

Next, 14 lithium ion secondary batteries (Examples 1 to 4 and Comparative Examples 1 to 10) in total were constructed using any one of the prepared positive electrode current collector foils. The details are as follows.

[Preparation of Positive Electrode]

$LiNi_{1/3}Co_{1/3}Mn_{1/3}O_2$ as a positive electrode active material; acetylene black (AB) as a conductive material; and PVdF as a binder were weighed at a weight ratio of 90:8:2. These materials were dispersed in NMP to prepare a paste-like positive electrode mixture. This positive electrode mixture was applied to opposite surfaces of each of the 14 positive electrode current collector foils (Examples 1 to 4 and Comparative Examples 1 to 10; aluminum foil) shown in Table 1, was dried, and was pressed. In this way, 14 positive electrode sheets according to Examples 1 to 4 and Comparative Examples 1 to 10 in which a positive electrode active material layer having a density of 2.2 g/cm³ was formed on the positive electrode current collector foil were prepared.

[Preparation of Negative Electrode]

Natural graphite whose surface was coated with an amorphous carbon film; SBR as a binder; and CMC as a thickener were weighed at a mass ratio of 98:1:1. These materials were dispersed in ion exchange water to prepare a negative electrode mixture. This negative electrode mixture was applied to opposite surfaces of the negative electrode current collector foil (length in the longitudinal direction: 310 cm, length in the width direction: 10.5 cm, thickness: 10 μm) formed of copper foil, was dried, and was pressed. In this way, a negative electrode sheet in which a negative electrode active material layer having a density of 1.1 g/cm³ was formed on the negative electrode current collector foil was prepared.

[Preparation of Separator]

A separator substrate having a thickness of 20 μm and a three-layer structure (PP/PE/PP) in which a polypropylene layer was formed on opposite surfaces of a polyethylene layer was prepared. Alumina powder (average particle size (D50): 0.1 μm) as an inorganic filler; an acrylic polymer as a binder; and CMC as a thickener were dispersed in water such that a mass ratio of the materials was 94.4:4.9:0.7. As a result, a composition for forming an inorganic filler layer was prepared. This composition for forming an inorganic filler layer was applied to a single surface of the separator substrate using a gravure roll and was dried. As a result, a heat resistance layer having a thickness of 5 μm was formed on the separator substrate. In this way, a separator having a total thickness of 25 μm was prepared.

[Preparation of Lithium Ion Secondary Battery]

Any one of the 14 prepared positive electrode sheets, the negative electrode sheet, and the two separators were laminated such that the heat resistance layer of the separator faced (was adjacent to) the negative electrode active material layer of the negative electrode sheet, and the obtained laminate was wound in a flat elliptical shape. As a result, 14 wound electrode bodies corresponding to the kinds of the positive electrode sheets were constructed. Next, electrode terminals were joined to end portions of positive and negative electrode current collector foils of each of the constructed wound electrode bodies, and the wound electrode body and the nonaqueous electrolytic solution were accommodated in a battery case formed of aluminum having a length of 75 mm, a width of 120 mm, a thickness of 15 mm, and a case thickness of 1 mm. 14 square lithium ion secondary batteries (Examples 1 to 4 and Comparative Examples 1 to 10) corresponding to the kinds of the positive electrode sheets were prepared. As the nonaqueous electrolytic solution, a solution was used in which $LiPF_6$ as a supporting electrolyte and LiBOB as a film forming agent were dissolved in a mixed solvent, the mixed solvent containing ethylene carbonate (EC), ethyl methyl carbonate (EMC), and dimethyl carbonate (DMC) at a volume ratio of 3:4:3. The concentration of $LiPF_6$ in the nonaqueous electrolytic solution was 1.1 mol/L, and the concentration of LiBOB in the nonaqueous electrolytic solution was 0.01 mol/L. However, in Comparative Examples 9 and 10 shown in Table 1, a nonaqueous electrolytic solution not containing LiBOB was used.

[Battery Performance Evaluation Test]

Regarding the obtained 14 batteries, the initial resistance value (mΩ) and the output (W) after a durability test were measured. That is, under a temperature condition of 25° C., each of the batteries was charged at a charging rate of 1 C such that the SOC thereof was adjusted to 60%. Next, under a temperature condition of 25° C., the battery was discharged at a constant current at a discharging rate of 15 C for 10 seconds. A decrease ΔV in battery voltage for 0 seconds to 10 seconds was measured. Based on the voltage decrease ΔV and the discharge current, the initial resistance (mΩ) was obtained according to Ohm's law. The results are shown in the corresponding items of Table 1.

After the measurement of the initial resistance, 4000 cycles of charging and discharging were repeatedly performed on each of the batteries, and the output after 4000 cycles (output after a durability test) was measured. Specifically, under a temperature condition of −30° C., the battery was charged to 3.0 V to 4.1 V at a constant current (10 A). Next, the battery was discharged to 3.0 V at a constant current (10 A). This charging-discharging cycle was repeated 500 times. Constant current-constant voltage (CC-CV) charging was performed on each of the batteries after 500 cycles such that the SOC was adjusted to 40%. Next, the battery was discharged at a constant power (W) of 160 W, 180 W, 200 W, or 220 W. The time (number of seconds for discharge) was measured until the battery voltage was decreased to 2.5 V (discharge cut voltage) from the start of discharge. The power value (W) during the discharge at the constant power was plotted with respect to the number of seconds for discharge, and a power value at the number of seconds for discharge of two seconds (that is, output at which the battery in the SOC 40% was discharged to 2.5 V in two seconds at −30° C.) was obtained. This power value was set as the output of the battery after a durability test at −30° C. The results of the batteries provided for the test are shown in the corresponding item of Table 1.

In the lithium ion secondary batteries according to Examples 1 to 4, the 60-degree specular gloss α in the direction parallel to the longitudinal direction of the positive electrode current collector foil and the 60-degree specular gloss β in the width direction (W) perpendicular to the longitudinal direction of the positive electrode current collector foil satisfied 700%≤α≤760% and 530%≤β≤590, respectively. As shown in Table 1, in the lithium ion secondary batteries according to Examples 1 to 4, the initial resistance value was suppressed to be relatively low, but the discharge output after a durability test was superior (209 W or higher). The above results implies the following point: by using the wound electrode body including the positive electrode current collector foil which is defined such that the 60-degree specular glosses α and β are in the above-described range, the biased presence of the Na component particularly in the center region of the wound electrode body in the winding axial direction is suppressed during the impregnation of the nonaqueous electrolytic solution, and the SEI film can be formed over the entire negative electrode active material layer while suppressing the formation non-uniformity. On the other hand, the results of each Comparative Example were as follows. In the lithium ion secondary batteries according to Comparative Examples 9 and 10 in which the nonaqueous electrolytic solution not containing the oxalato borate complex such as LiBOB was used, the SEI film derived from the complex was not formed, and thus the durability performance was low. In the lithium ion secondary batteries according to Comparative Examples 6 and 8 in which the 60-degree specular gloss α was excessively high, and in the lithium ion secondary batteries according to Comparative Examples 3 and 4 in which the 60-degree specular gloss β was excessively low, the initial resistance value was high, and the durability performance was low. Conversely, in the lithium ion secondary batteries according to Comparative Examples 5 and 7 in which the 60-degree specular gloss α was excessively low, and in the lithium ion secondary batteries according to Comparative Examples 1 and 2 in which the 60-degree specular gloss β was excessively high, the initial resistance value was low, but the impregnation speed of the nonaqueous electrolytic solution was not suppressed. Therefore, due to the formation non-uniformity of the SEI film and the like, the output performance after a durability test of the battery was still low.

According to the aspect of the invention, on the surface of the negative electrode (typically, the surface of the negative electrode active material) of the nonaqueous electrolyte secondary battery including the wound electrode body, the formation non-uniformity of the SEI film derived from the oxalato borate complex such as LiBOB is suppressed. As a result, a nonaqueous electrolyte secondary battery in which a film having a preferable configuration is formed; and a method of manufacturing the same can be provided.

Hereinabove, specific examples of the invention have been described in detail. However, these examples are merely exemplary and do not limit the claims. The technique described in the claims includes various modifications and alternations of the above-described specific examples.

What is claimed is:

1. A nonaqueous electrolyte secondary battery comprising:
a wound electrode body that is formed by laminating an elongated sheet-shaped positive electrode current collector foil, an elongated sheet-shaped negative electrode current collector foil, and an elongated sheet-shaped separator to obtain a laminate and winding the obtained laminate, in which the positive electrode current collector foil has a surface on which a positive electrode active material layer containing a positive electrode active material is formed, and the negative electrode current collector foil has a surface on which a negative electrode active material layer containing a negative electrode active material is formed;
a nonaqueous electrolytic solution; and
a case that accommodates the wound electrode body and the nonaqueous electrolytic solution, wherein
a solid electrolyte interface film derived from an oxalato borate complex is formed on at least a surface of the negative electrode active material layer, wherein a sodium component is present, and
the positive electrode current collector foil satisfies the following conditions of $$700\% \leq \alpha \leq 760\% \text{ and} \tag{a}$$

$$530\% \leq \beta \leq 590\% \tag{b}$$

where α represents a 60-degree specular gloss, calculated using a measurement method according to JIS Z 8741: 1997, in a direction parallel to a longitudinal direction of the positive electrode current collector foil, and
β represents a 60-degree specular gloss, calculated using a measurement method according to JIS Z 8741:1997, in a width direction perpendicular to the longitudinal direction of the positive electrode current collector foil, wherein
the positive electrode current collector foil is aluminum foil having an overall arithmetic average roughness of 0.08 μm to 0.12 μm.

2. The nonaqueous electrolyte secondary battery according to claim 1, wherein
the oxalato borate complex is lithium bis(oxalato)borate.

3. A battery pack comprising:
a plurality of nonaqueous electrolyte secondary batteries that are electrically connected to each other, wherein
each of the plurality of nonaqueous electrolyte secondary batteries is the nonaqueous electrolyte secondary battery according to claim 1.

4. A method of manufacturing a nonaqueous electrolyte secondary battery, the method comprising:
forming a wound electrode body by laminating an elongated sheet-shaped positive electrode current collector foil, an elongated sheet-shaped negative electrode current collector foil, and an elongated sheet-shaped separator to obtain a laminate and winding the obtained laminate, in which
the positive electrode current collector foil has a surface, on which a positive electrode active material layer containing a positive electrode active material is formed, and is adjusted to satisfy the following conditions of $$700\% \leq \alpha \leq 760\% \text{ and} \tag{a}$$

$$530\% \leq \beta \leq 590\% \tag{b}$$

where α represents a 60-degree specular gloss, calculated using a measurement method according to JIS Z 8741:1997, in a direction parallel to a longitudinal direction of the positive electrode current collector foil, and β represents a 60-degree specular gloss, calculated using a measurement method according to JIS Z 8741:1997, in a width direction perpendicular to the longitudinal direction of the positive electrode current collector foil, and the negative electrode current collector foil has a surface on which a negative electrode active material layer containing a negative electrode active material is formed; and accommodating a nonaqueous electrolytic solution and the wound electrode body in a battery case and impregnating the wound electrode body with the nonaqueous electrolytic solution from end portions of the wound electrode body in a width direction perpendicular to a longitudinal direction of the wound electrode body, in which the nonaqueous electrolytic solution contains an oxalato borate complex capable of forming a solid electrolyte interface film on at least a portion of the negative electrode active material layer after charging, wherein the positive electrode current collector foil is aluminum foil having an overall arithmetic average roughness of 0.08 μm to 0.12 μm, and a sodium component is present.

5. The method according to claim 4, wherein the nonaqueous electrolytic solution contains a lithium bis(oxalato)borate as the oxalato borate complex.

* * * * *